Feb. 23, 1937. G. J. MOELLER 2,071,648
PISTON EXPANDER INSERTER
Filed Dec. 30, 1935
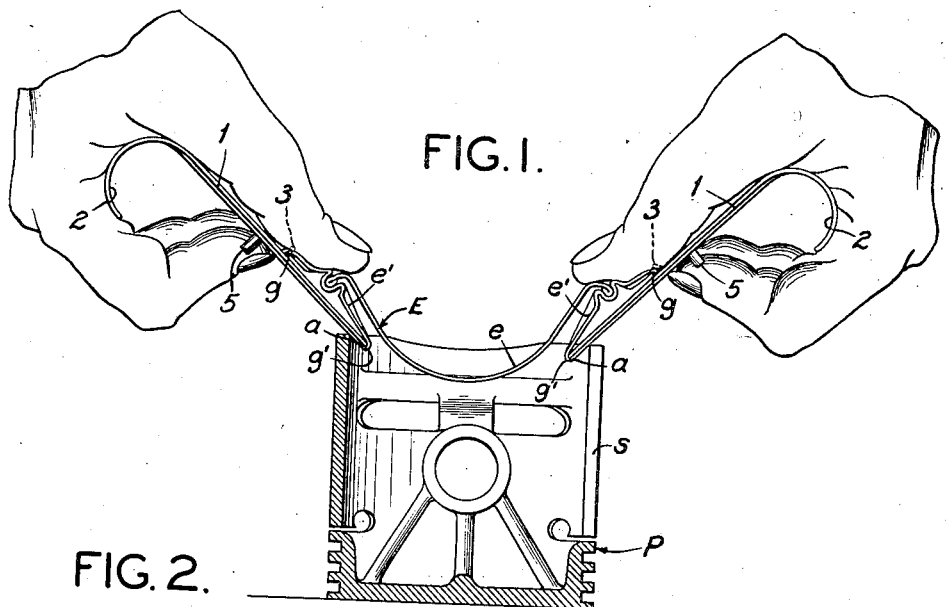
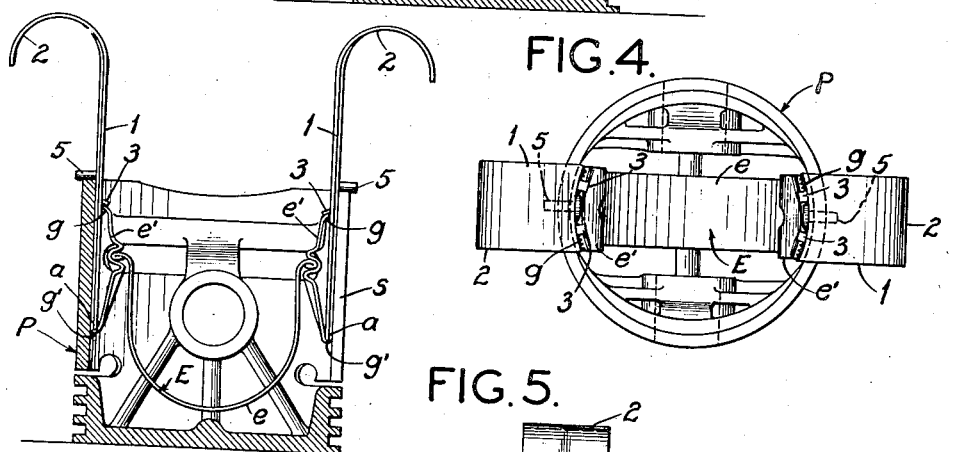
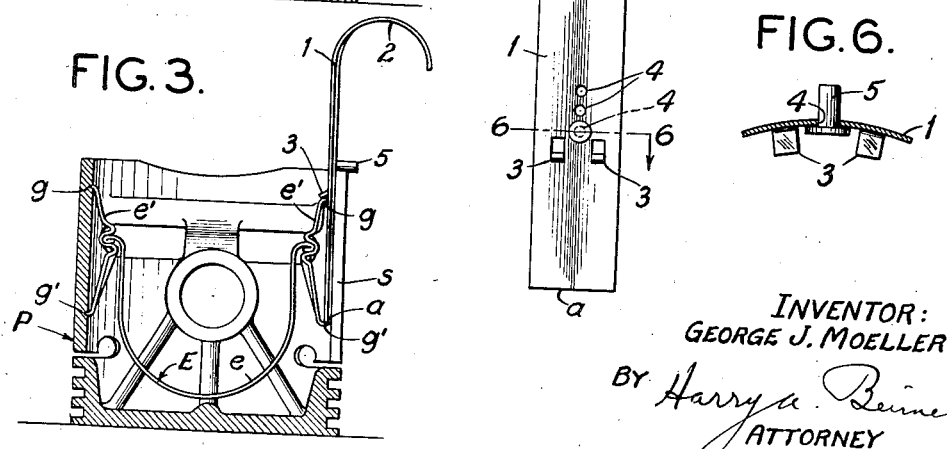
INVENTOR:
GEORGE J. MOELLER
BY Harry A. Beimes
ATTORNEY Patented Feb. 23, 1937

2,071,648

UNITED STATES PATENT OFFICE 2,071,648

PISTON EXPANDER INSERTER

George J. Moeller, St. Louis, Mo., assignor to Ramsey Accessories Manufacturing Corporation, St. Louis, Mo., a corporation of Missouri Application December 30, 1935, Serial No. 56,762

2 Claims. (Cl. 29—87.1)

My invention has relation to improvements in devices for inserting skirt expanders in pistons, and consists in the novel features of construction more fully set forth in the specification and pointed out in the claims.

The invention is more particularly directed to what I choose to call an expander inserter, and it comprises a pair of metallic plate-like members with suitable formations for engaging the expander whereby the expander may be inserted within the piston skirt, and it includes a pair of stop elements to insure the correct location of the expander within the skirt.

Accordingly, the object of the invention is to provide an expander inserter for the purpose just stated that will firmly engage the expander and that may be easily manipulated. Other advantages will be better apparent from a detailed description of the invention in connection with the accompanying drawing, in which:

Figure 1 shows a vertical longitudinal section through a piston and a piston skirt expander associated with the inserter held in the hands of an operator for the purpose of inserting the expander within the piston skirt; Fig. 2 shows a similar section of the piston into which the piston expander, shown in side elevation, has been inserted by the inserters which are still in engagement with the expander; Fig. 3 is a section similar to Fig. 2 with one of the expander inserters removed and the expander being in firm engagement with the inside of the piston skirt at one side, the other inserter still remaining in place; Fig. 4 is a bottom plan of a piston with the expander and inserters in the position shown in Fig. 2; Fig. 5 is an inside face view or front elevation of one of the inserters; and Fig. 6 is a horizontal, cross-sectional detail taken on the line 6—6 of Fig. 5.

Referring to the drawing, P represents a conventional alloy piston provided with the customary longitudinal slot $s$, which is to be equipped with a skirt expander E of the type shown in my Patent No. 2,027,872, dated January 14, 1936. This type of expander, as explained in said patent, comprises a U-shaped spring element $e$, to the ends of which are hingedly secured suitable shoes $e'$, $e'$ for gripping the inner surface of the piston skirt. For this purpose the shoes have their upper and lower edges $g$, $g'$ serrated or provided with teeth for biting into the metal of the piston skirt. An expander of this type is difficult to insert on account of the stiffness of the spring element $e$ unless an appropriate tool is used to assist in the insertion thereof. I have accordingly devised an inserter which comprises two similar members 1, 1 in the shape of an elongated plate-like member, one end of each of which terminates in a hook or handle 2. Since the members 1, 1 are identical the description of one of them will serve for both.

The plate-like member 1 is slightly concavo-convex to conform to the curvature of the piston skirt in order that it may snugly hug said skirt when being inserted therein, as will presently be explained. Intermediate the ends of the member 1 are a pair of lugs 3, 3 projecting outwardly from the concave surface of the member, said lugs being spaced upwardly from the bottom edge $a$ a distance slightly less than the distance between the serrated edges $g$, $g'$ of the shoe $e'$. The object of thus spacing the lugs 3, 3 from the lower edge $a$ of the member is to enable said lugs to bear against the serrated edge $g$ of the shoe $e'$ while the lower edge $a$ of the member contacts with the shoe $e'$ in close proximity with the lower serrated edge $g'$ thereof.

It will be observed that there is a plurality of alined openings 4, 4, 4 disposed on the center line of the member 1 and disposed upwardly from the lugs 3, 3, in one of which is inserted a pin 5 which serves as an adjustable lug for limiting the extent to which the inserter 1 may be inserted into the piston skirt. By varying the location of the pin 5 from hole to hole the inserter may be adapted to pistons of different sizes; that is, for longer pistons the pin 5 will be moved into a higher hole with respect to the lower edge $a$ of the inserter.

The operation of my improved expander inserter is as follows:

A pair of the inserter members 1, 1, obviously, comprise the complete inserter and the members 1, 1 are caused to engage with the shoes $e'$, $e'$ in the manner shown in Fig. 1. That is to say, the handle end 2 is held in the hand of the operator who applies the inserter so that the lugs 3, 3 will engage the edge $g$ of the shoe, and the lower edge $a$ will bear against the shoe just inside the lower serrated edge $g'$ thereof. With the expander E thus firmly held between the members 1, 1 the operator pushes downwardly on the inserters, which of course carry with them the expander E and slide the same into the piston skirt until the stop lugs 5, 5 engage with the bottom edge of the piston, as shown in Fig. 2. The expander E is now fully inserted within the skirt and the inserted members 1, 1 may be removed. This is done by the operator pulling the inserters out of the skirt one at a time, and at the same time pressing down on the spring element $e$ to avoid dislodgment of the expander. As the inserter member 1 is removed the tension of the spring element e will snap the shoe against the piston skirt causing the serrated edges to bite into the metal thereof and hold the expander firmly in place.

Fig. 3 shows one of the expanders removed and the serrated edges g, g' of one of the shoes e' in penetrating relation with the skirt of the piston P. Obviously the same thing will happen on the other side when the inserter member 1 is removed. It should be apparent by referring to Fig. 3 that if the pin 5 were disposed farther from the lower edge a and of course farther from the lugs 3, 3 of the member 1 the inserter will force the expander more deeply into the piston. It is for this reason that several holes 4 are provided for the pin 5 in order that the inserter may be adapted to pistons of different sizes.

Having described my invention, I claim:

1. As an article of manufacture, an inserter for piston skirt expanders comprising an elongated plate-like member having a lug projecting from one side thereof adapted for engagement with an expander, and a stop lug adjustably mounted in said plate-like member and projecting from the side opposite to the first mentioned lug, said stop lug being adapted for engagement with the open end of a piston.

2. As an article of manufacture, an inserter for piston skirt expanders comprising an elonlated plate-like member, said plate-like member having a lug projecting from one side thereof, a series of holes arranged lengthwise of said member, and a pin removably positioned in one of said holes.

GEORGE J. MOELLER.